B. KUNKEL.
BATTERY COVER.
APPLICATION FILED FEB. 11, 1921.
1,424,144.
Patented July 25, 1922.
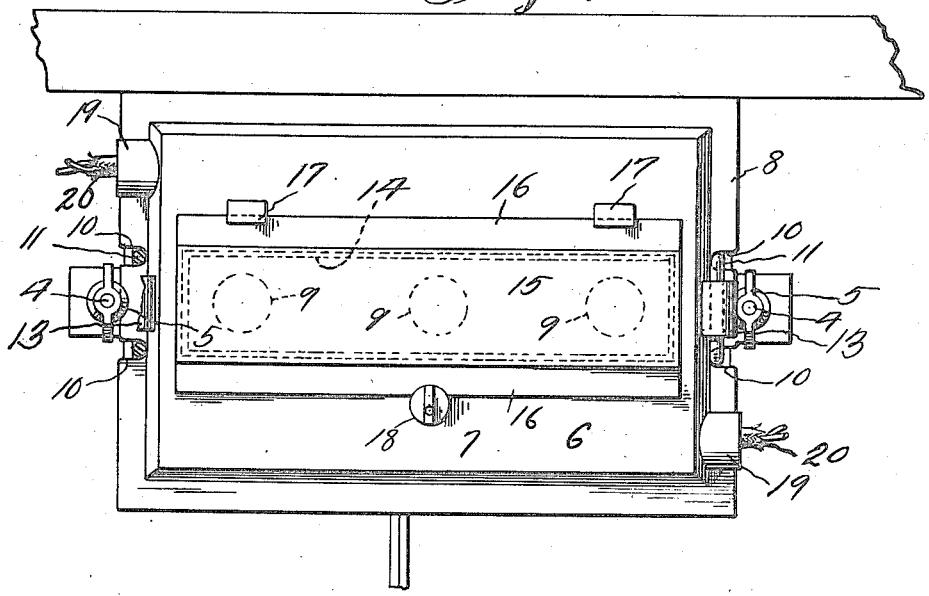
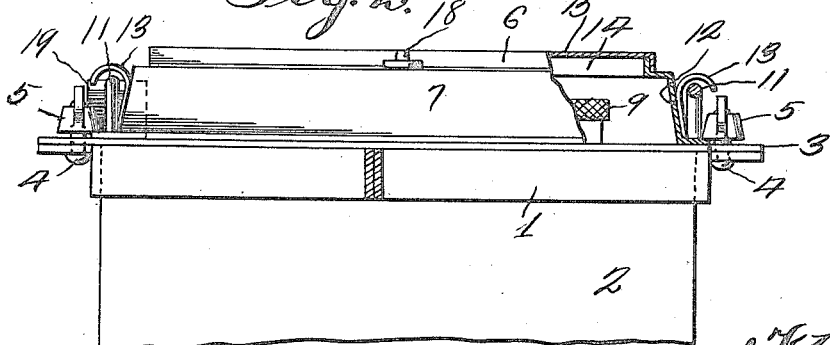
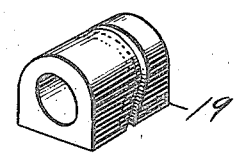
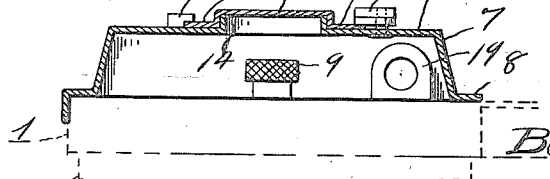
Inventor
Bert Kunkel
By D. Swift
Attorney

UNITED STATES PATENT OFFICE.

BERT KUNKEL, OF HART, MICHIGAN.

BATTERY COVER.

1,424,144.   Specification of Letters Patent.   Patented July 25, 1922.

Application filed February 11, 1921. Serial No. 444,225.

*To all whom it may concern:*

Be it known that I, BERT KUNKEL, a citizen of the United States, residing at Hart, in the county of Oceana, State of Michigan, have invented a new and useful Battery Cover; and I do hereby declare the following to be a full, clear, and exact description of the invention, such as will enable others skilled in the art to which it appertains to make and use the same.

The invention relates to battery covers and has for its object to provide a device of this character for covering batteries on motor driven vehicles where said batteries are in a position on the vehicle where mud will be thrown on the battery, for instance supported in a frame under the rear seat which is common in several types of automobiles.

A further object is to provide a battery cover comprising a dished member having a flange adapted to engage the upper side of the battery and be detachably secured thereto, said dished member having an elongated flanged centrally disposed opening provided with a removable cover, by the removal of which cover access may be had to the filling openings and terminals of the battery without removing cover as a whole.

A further object is to provide insulating blocks in the side wall of the cover through which the battery connecting wires may pass.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a top plan view of a battery in a battery frame, showing the cover applied thereto.

Figure 2 is a side elevation of the battery showing the cover applied thereto and partly in section.

Figure 3 is a transverse sectional view through the battery cover, showing the same on a battery.

Figure 4 is a perspective view of one of the insulating members carried by the battery cover.

Referring to the drawings, the numeral 1 desigates a conventional form of battery supporting rack which is horizontally disposed, and in which rack a conventional form of battery 2 is supported. Racks of this character are generally disposed beneath the rear seat of a number of types of automobiles and are not protected from mud and water thrown upon the same by the rear wheels of the automobile. Where the battery is exposed and mud and water thrown upon the same, short circuits develop. Battery 2 is provided with a flange 3 which engages the upper side of the rack 1 and is secured thereto by screws 4 which are provided with wing nuts 5. The battery cover 6 comprises the casing 7 which is disposed over the terminals and filling openings 9 of the battery, said cover engaging the flange 3 of the battery and is held thereon by means of the wing nuts 5 which engage the flange 8 as clearly shown in Figure 2, there being cutaway portions 10 in the flange 8 for the reception of the vertical portion of the handle members 11 of the battery, by means of which handle members, the battery may be placed in position. Soldered or otherwise secured to the end walls of the casing 7 as at 12 are handle members 13 for the casing by means of which handle members a cover may be easily and quickly removed.

The casing 7 is provided with an elongated centrally disposed flanged opening 14 which is normally closed by the flanged closure 15, said flanged closure 15 being provided on its longitudinal edges with flanges 16, which engage the upper face of the casing 7. One of the flanges 16 is disposed beneath the lugs 17 carried by the casing 7 and the other flange is disposed beneath an eccentrically pivoted member 18, which member when partially rotated allows the closure 15 to be raised upwardly at the opposite side to the lug 17 and the flange 16 removed from engagement with the lug 17. It will be seen that when the closure 15 is removed that access may be had to the filling openings 9 of the battery, without entirely removing the cover from the battery. It will also be seen that the battery cover as a whole will be protected from mud and water at all times thereby obviating short circuits. The end walls of the casing 7 are provided with removable apertured blocks 19, through which blocks the battery wires 20 pass, said blocks being formed from insulating material.

The invention having been set forth what is claimed as new and useful is:—

The combination with an electric battery for motor driven vehicles, said battery having aligned filling openings substantially centrally thereof, of a cover for said battery, said cover comprising a main cover and an auxiliary cover, said main cover entirely enclosing the upper side of the battery and provided with an elongated opening disposed above the battery filling openings, said auxiliary cover being detachably connected to the main cover and normally closing the elongated openings in the main cover.

In testimony whereof I have signed my name to this specification in the presence of two subscribing witnesses.

BERT KUNKEL.

Witnesses:
   E. R. AVERILL,
   E. B. SPRIGG.